US012305655B2

(12) United States Patent
Tsai

(10) Patent No.: US 12,305,655 B2
(45) Date of Patent: May 20, 2025

(54) PARALLEL-CONNECTED LIGHTING FAN

(71) Applicant: SUPER FLOWER COMPUTER INC., New Taipei (TW)

(72) Inventor: Tsung Yen Tsai, New Taipei (TW)

(73) Assignee: SUPER FLOWER COMPUTER INC., New Taipei (TW)

( * ) Notice: Subject to any disclaimer, the term of this patent is extended or adjusted under 35 U.S.C. 154(b) by 0 days.

(21) Appl. No.: 18/783,033

(22) Filed: Jul. 24, 2024

(65) Prior Publication Data

US 2024/0426306 A1 Dec. 26, 2024

Related U.S. Application Data

(63) Continuation-in-part of application No. 18/211,759, filed on Jun. 20, 2023, now Pat. No. 12,123,588.

(30) Foreign Application Priority Data

Jun. 17, 2024 (TW) ................................ 113122382

(51) Int. Cl.

| | |
|---|---|
| ***F04D 25/06*** | (2006.01) |
| ***F04D 25/16*** | (2006.01) |
| ***F04D 29/52*** | (2006.01) |
| ***F21V 33/00*** | (2006.01) |
| ***H01R 13/22*** | (2006.01) |

(Continued)

(52) U.S. Cl.

CPC ........... *F04D 25/06* (2013.01); *F04D 25/166* (2013.01); *F04D 29/522* (2013.01); *F21V 33/0096* (2013.01); *H01R 13/22* (2013.01); *H01R 13/631* (2013.01); *F21Y 2115/10* (2016.08)

(58) Field of Classification Search

None

See application file for complete search history.

(56) References Cited

U.S. PATENT DOCUMENTS

| | | | | |
|---|---|---|---|---|
| 9,634,415 | B2 * | 4/2017 | Ye | H05K 7/1435 |
| 11,686,467 | B1 * | 6/2023 | Yuan | F04D 25/166 362/96 |

(Continued)

OTHER PUBLICATIONS

Corn Electronics (Accessed on Dec. 13, 2024 from: https://www.newegg.com/p/13C-004P-000Y6; Date First Available Nov. 20, 2023) (Year: 2023).*

*Primary Examiner* — Juan G Flores

(74) *Attorney, Agent, or Firm* — Chun-Ming Shih; LANWAY IPR SERVICES

(57) ABSTRACT

A parallel-connected lighting fan which includes an outer frame, an electric motor and a fan blade arranged at a center of the outer frame, a plug-in electrical connector, and a light emitting member is provided. The outer frame is provided with a plurality of slots. When the two lighting fans of the same type are connected in parallel, the two slots of the two outer frames adjacent to each other form a linked slot. Both the plug-in electrical connector and the slot are provided with corresponding electrodes. The lighting fans of the same type can be connected in parallel conveniently, quickly, and reliably by the plug-in electrical connector being inserted into the linked slot in a plug-in direction, without coming off easily. The replaceable design of the plug-in electrical connector allows easy replacement and maintenance during loss or failure.

15 Claims, 10 Drawing Sheets

(51) Int. Cl.
*H01R 13/631* (2006.01)
*F21Y 115/10* (2016.01)

(56) References Cited

U.S. PATENT DOCUMENTS

| | | | | |
|---|---|---|---|---|
| 2016/0204535 | A1* | 7/2016 | Ye | H01R 13/17 439/66 |
| 2022/0381253 | A1* | 12/2022 | Chang | F04D 29/403 |
| 2024/0117815 | A1* | 4/2024 | Xu | F04D 29/644 |

* cited by examiner

PARALLEL-CONNECTED LIGHTING FAN

FIELD OF THE INVENTION

The present invention relates to a computer fan, especially to a parallel-connected lighting fan which is able to be connected with a plurality of the lighting fans of the same type in parallel quickly.

BACKGROUND OF THE INVENTION

Refer to Taiwanese Pat. No. M580203 already granted, an illumination fan connectable with at least one illumination fan for a computer is provided. The illumination fan includes a fan in center of a body, an illumination area on at least two sides of the fan at top of the body, a power socket and a first connector on one side of the body, and a second connector on another side of the body. The power socket is electrically connected with the first connector, the second connector, the fan and the illumination area of the body. The fan and the illumination area are respectively driven to rotate and illuminate when the power socket is connected to a power source. After the first connector of the body being joined with the second connector of another body, a fan and an illumination area of the another body are respectively driven to rotate and illuminate.

The above first and the connectors are fixed on the body of the fan and easy to be oxidized and worn-out after being used for a period of time. Then poor contact or breakdown may occur. Thus the whole illumination fan for the computer must be replaced or discarded. This is wasteful and the service life of the illumination fan is affected.

Refer to Taiwanese Utility Pat. No. M635856, an illumination fan connection structure is provided. The illumination fan connection structure connection structure includes a plurality of illumination fans and external connectors. The illumination fans are connected in parallel and arranged adjacent to each other. A blade of the illumination fan is disposed in a frame while a light guide ring combined with a lighting module is arranged around the blade. The frame is provided with a locking portion and a fan circuit board which is electrically connected to the blade and the lighting module. The external connector consists of a plate base with a pair of locking hooks and a connection circuit board with a first and a second pins. The plate base is arranged between the two adjacent illumination fans and the locking portions of the adjacent illumination fan are hooked by the locked hooks of the plate base so that the first pin and the second pin are respectively electrically connected to one of fan circuit boards and the other fan circuit board. Thereby wire-arranging complexity is reduced and the illumination fan is more convenient to use. The external connector of the illumination fan of Patent No. M635856 mentioned above is not only used for power transmission but also used in combination with a holder to connect the two adjacent illumination fans in parallel.

The main components used for connection of the two adjacent illumination fans include only a pair of locking hooks on the plate base of the external connector and the holder also provided with locking hooks. By the locking hooks hooked with the locking portions of the adjacent illumination fan, the whole structure strength is weak. Moreover, the plate base of the external connector and the holder are not designed to have acceptable and convenient part to which a force can be applied. Thereby the plate base and the holder can be disassembled only by screwdrivers or other tools. Thus the components for connection of the illumination fans is inconvenient to use.

SUMMARY

Therefore, it is a primary object of the present invention to provide a parallel-connected lighting fan which is convenient and fast to be connected to a plurality of the lighting fans of the same type in parallel. Electrical connection of the plurality of the lighting fans is completely at the same while the lighting fans connected are not coming off easily.

In order to achieve the above object, a parallel-connected lighting fan according to the present invention includes an outer frame, an electric motor provided with a fan blade connected to an output shaft of the electric motor, a plug-in electrical connector, and a light emitting member. The outer frame is provided with a plurality of slots each of which is formed at an intersection of two adjacent sides of the outer frame. A plurality of first electrodes is disposed on each of the slots and both side walls of the respective slots is provided with a first guide rail corresponding to each other. When the two outer frames of the same type are connected in parallel, the two slots of the two outer frames adjacent to each other form a linked slot. The first electrodes of the slots of the same outer frame are electrically connected in a one-on-one manner. The electric motor is provided with a fan blade connected to an output shaft of the electric motor. Both the electric motor and the fan blade are arranged at a center of the outer frame and the electric motor is electrically connected to the first electrode of one of the plurality of the slots for getting power. The plug-in electrical connector is composed of a housing and a circuit board mounted in the housing. The housing is provided with a third guide rail while the circuit board consists of a plurality of second electrodes and a plurality of third electrodes which are electrically connected to the second electrodes in a one-on-one manner. The plug-in electrical connector can be plugged into or unplugged from the linked slot in a pluggable direction. When the plug-in electrical connector is inserted into the linked slot, the second electrodes are in contact with the first electrodes of one of the two outer frames parallel connected to each other while the third electrodes are in contact with the first electrodes of the other one of the outer frames parallel connected to each other. At the same time, the third guide rail is just coupled with the first guide rails of the linked slot to link the two outer frames of the same type connected in parallel. The light emitting member is electrically connected to one of the electrodes including the first electrode, the second electrode, and the third electrode.

Preferably, one side of the outer frame of the lighting fan used for connection with another lighting fan is provided with a first magnetic member while another side of the outer frame opposite to the side of the outer frame with the first magnetic member is provided with a second magnetic member which is mated with the first magnetic member.

Preferably, the first magnetic member and the second magnetic member are magnets able to be magnetically attached to each other.

Preferably, the first electrode is golden finger while the second and the third electrodes are spring-pin elastic electrodes or spring-plate elastic electrodes.

Preferably, the first guide rail is a long strip member projecting from the two side walls of the slot while the third guide rail is a long straight groove formed on a surface of an outer side of the housing.

Preferably, the light emitting member is a light emitting diode (LED) or a small liquid crystal display (LCD).

Preferably, the light emitting member is a single-color LED or a multi-color LED.

Preferably, the plug-in electrical connector further includes a push button switch which consists of a push button, a spring, a back cover, and a push-type fastener. The push-type fastener is arranged at the slot of the outer frame and provided with a moveable claw. The push button is slidably disposed on the housing and moved forward and backward to an act position and a release position in the pluggable direction. The spring is arranged between a back surface of the push button and the back cover for providing an elastic force to push the push button back to the release position in an elongated state. The push button together with the circuit board is mounted in the housing and the back cover is disposed on the bottom of the housing for sealing the push button and the circuit board in the housing. The second electrodes and the third electrodes of the circuit board are inserted through the back cover to be exposed and in contact with the first electrodes of the outer frame. A back surface of the push button is provided with at least one latch extending in the plug-in direction. The moveable claw can clip the latch to hold the push button at the act position so that the plug-in electrical connector is further fixed in the linked slot. Once the latch is released from the moveable claw, the push button is pushed back to the release position by the elastic force of the spring. Thereby the plug-in electrical connector is further pulled out of the linked slot.

Preferably, the push button is provided with the two latches arranged in parallel and interacting with the two push-type fasteners correspondingly when the two outer frames of the same type are connected in parallel.

Preferably, the push button further includes a button cap and a stopping portion projecting from a periphery of the button cap. A top of the button cap is inserted through an opening on a top of the housing and the push button can be moved freely along the plug-in direction. The stopping portion would interfere with an edge of the opening of the housing to prevent the push button from coming off the housing.

Preferably, the light emitting member is a light emitting diode (LED) which is arranged at the circuit board and electrically connected to the second electrode or the third electrode. A front surface of the button cap is provided with a translucent portion which permits light emitted from the LED to pass through. Preferably, the translucent portion is a through hole which is in the form of a word or a figure. The LED is a single-color LED or a multi-color LED.

Preferably, the light emitting member is a small liquid crystal display (LCD) disposed on the side of the outer frame and electrically connected to the first electrode.

Preferably, at least one of the plug-in electrical connectors is provided with an external power cord having one end electrically connected to the second electrode or the third electrode and the other end electrically connected to a power connector.

Preferably, the outer frame is rectangular and each of the two parallel sides of the outer frame is provided with the slots. For the plurality of the slots disposed on the same parallel-connected lighting fan, the first electrodes of the slots are electrically connected in a one-on-one manner by layout (wires) inside the same outer frame. The first electrodes of the slots share one external power cord and one power connector to get power supply from the outside.

Preferably, the two side walls of the slot and the housing of the plug-in electrical connector in the linked slot are provided with corresponding insertion holes.

The parallel-connected lighting fan according to the present invention has the following advantages and functions. While connecting the lighting fans of the same type in parallel, a plurality of the lighting fans of the same type is connected in parallel conveniently and quickly by the plug-in electrical connector. The plug-in electrical connector has a replaceable design. When electrode oxidation or wear-out occurs after the lighting fan being used for a period of time, only the plug-in electrical connector need to be replaced for solving the above problems. There is no need to replace or discard the whole lighting fan of the computer. Thereby the service life of the computer lighting fan is extended and waste of resources is avoided.

As to implementations, technical features and functions of the present invention, please refer to the following embodiments with detailed descriptions and related figures.

BRIEF DESCRIPTION OF THE DRAWINGS

FIG. 5-1 and FIG. 5-2 are schematic drawings showing operation of a plug-in electrical connector of an embodiment according to the present invention;

DETAILED DESCRIPTION

In the following descriptions and embodiments in figures according to the present invention, directions mentioned (such as upper, lower, left, right, front and rear) are defined according to related figures and used for showing structure or relationship (such as positions, connections, and actions) among respective components. In principle, the directions described are proper when positions of the components or the structure mentioned in the specifications matches those in figures. Once the positions of the components or the structure mentioned in the specifications change, the directions described should have corresponding changes.

Figure 1:
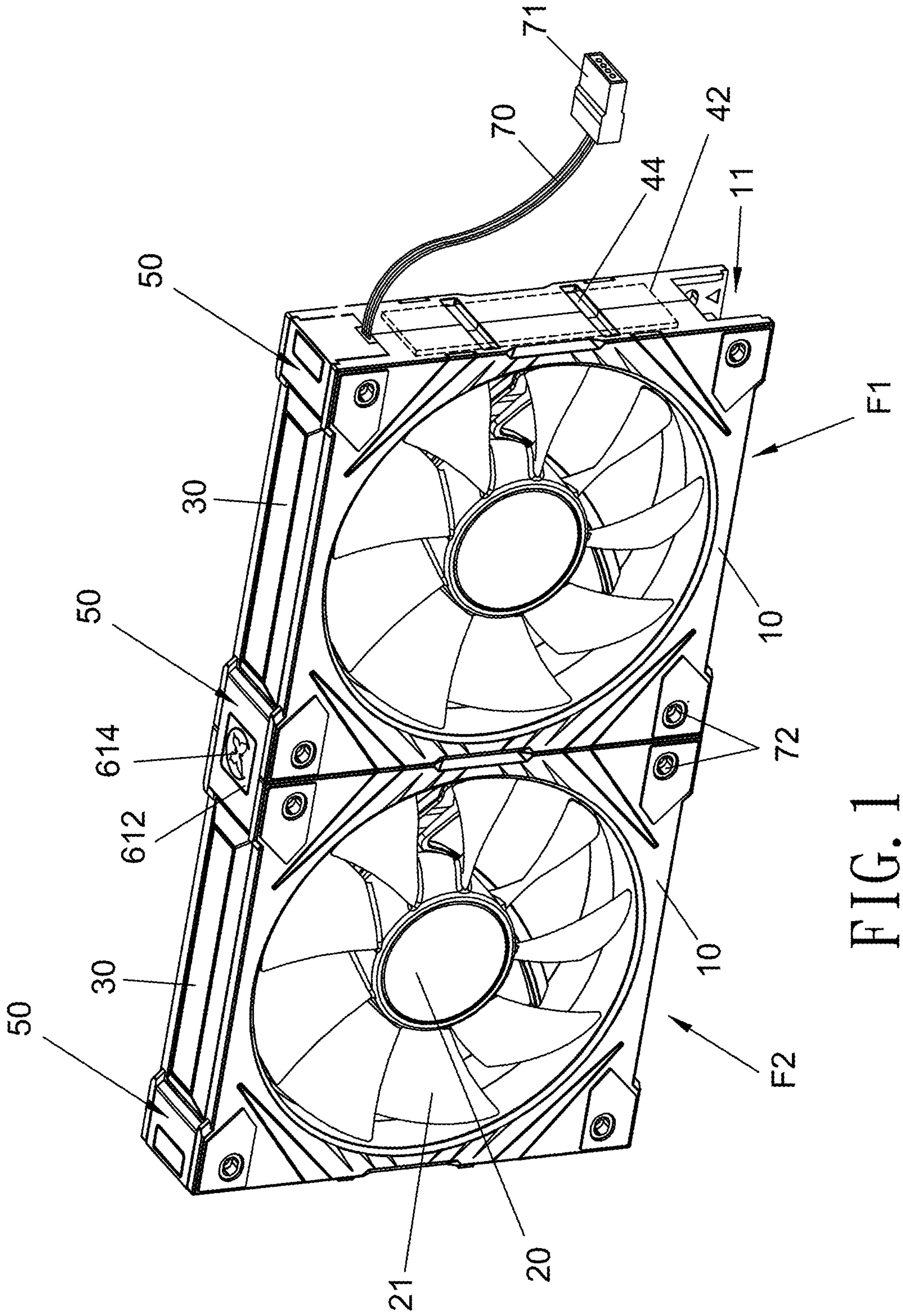
FIG. 1 is a schematic drawing showing structure of an embodiment according to the present invention.
Figure 2:
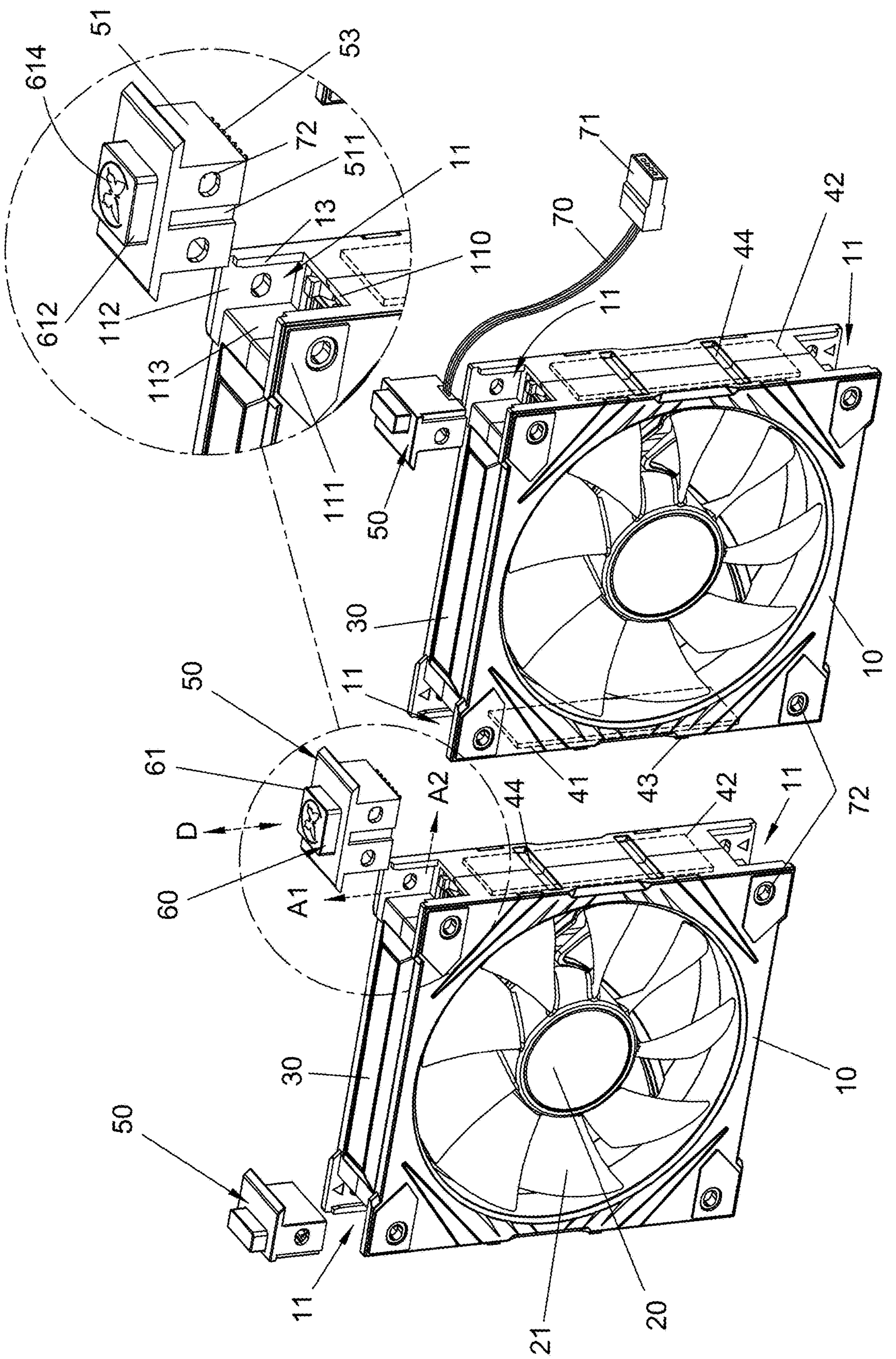
FIG. 2 is an exploded view of the embodiment in FIG. 1 according to the present invention.

Refer to FIG. 1 and FIG. 2, a schematic drawing showing structure and an exploded view of an embodiment of a parallel-connected lighting fan are provided. The present invention provides a parallel-connected lighting fan able to be connected to the lighting fans of the same type in parallel. For easy understanding and explanation, there are two parallel-connected lighting fans of the same type and having the same structure shown in FIG. 1 and FIG. 2. An outer frame 10 of the first parallel-connected lighting fan F1 is connected to an outer frame 10 of the second parallel-connected lighting fan F2 in parallel.

In a preferred embodiment of the present invention, a parallel-connected lighting fan according to the present invention includes an outer frame 10, an electric motor 20 provided with a fan blade 21 connected to an output shaft of the electric motor 20, a plug-in electrical connector 50, and a light emitting member 30.

The outer frame 10 is provided with a plurality of slots 11 each of which is formed at an intersection of two adjacent sides of the outer frame 10 and recessed toward a center of the outer frame 10. The slot 11 is defined by a bottom surface 110, two side walls 111, 112 parallel to each other, and a back surface 113. In a preferred embodiment, the slot 11 includes openings A1, A2 toward different directions. The plug-in electrical connector 50 can be mounted into or removed from the slot 11 through the opening A1 in a plug-in direction D. The opening A2 is facing another opening A2 of a slot 11 of an outer frame 10 going to be connected in parallel. Structures of the two slots 11 located at two ends of the same side of the same outer frame 10 are symmetrical to each other.

Figure 3:
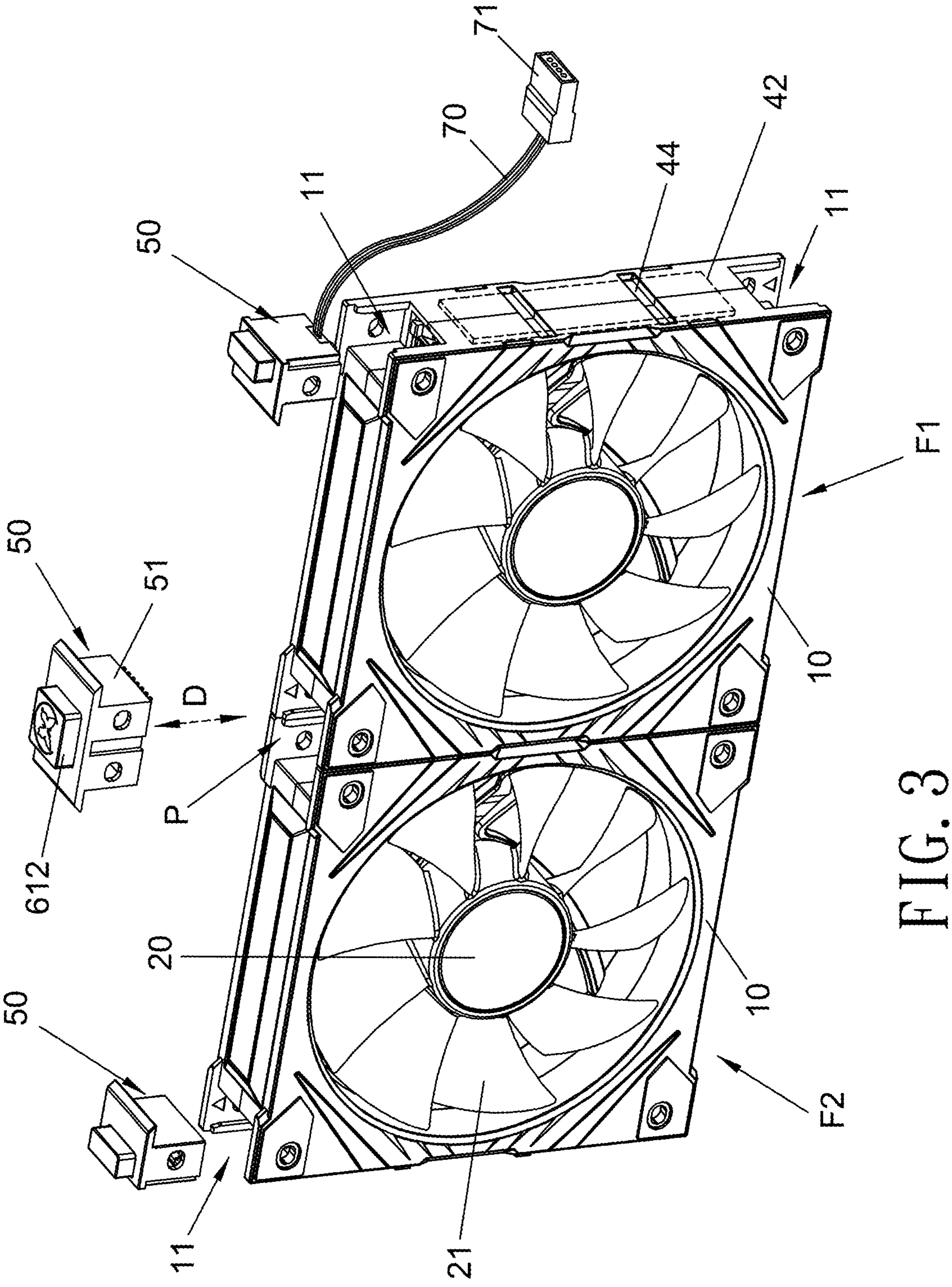
FIG. 3 and FIG. 4 are schematic drawings showing operation of parallel connection of an embodiment according to the present invention.
Figure 8:
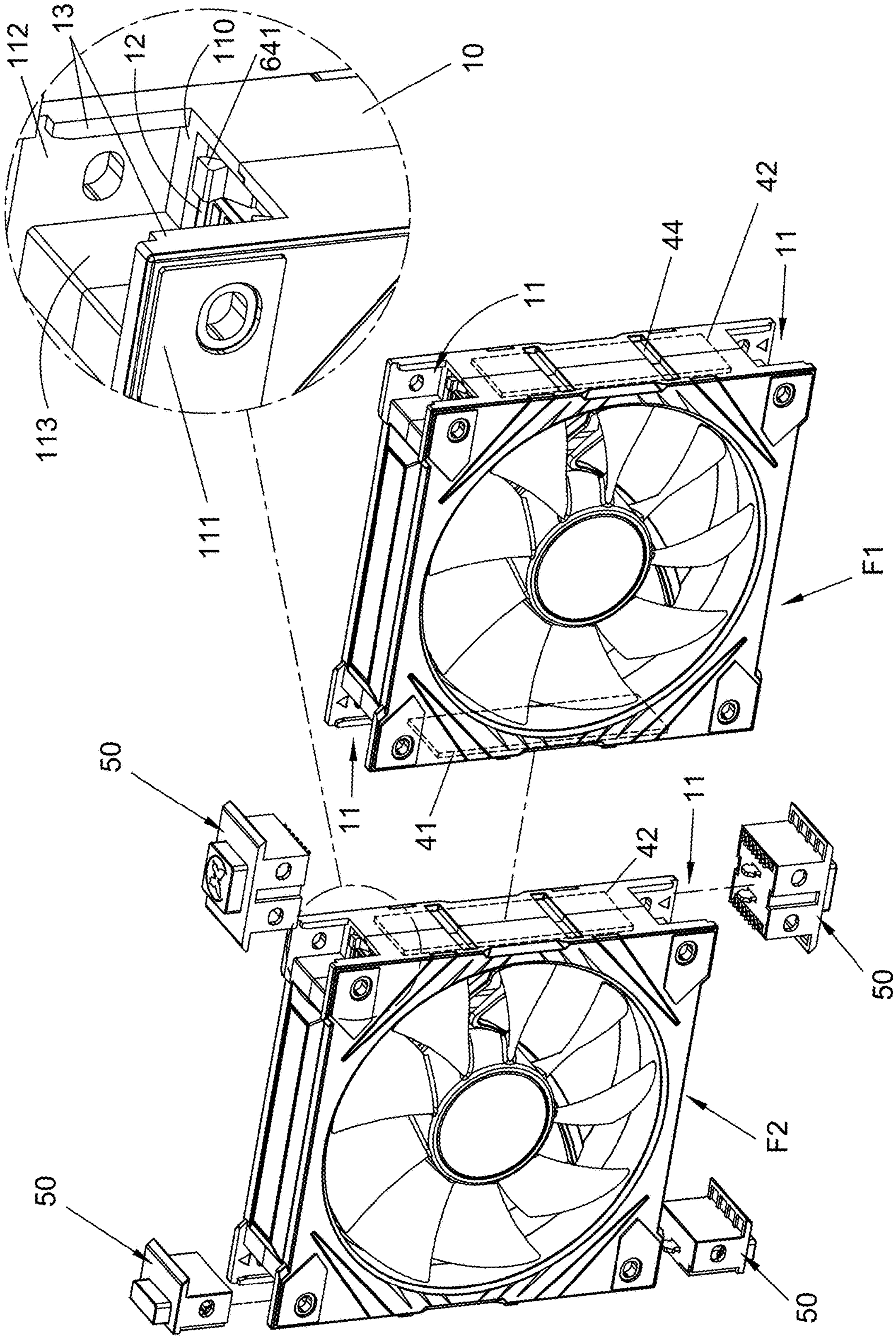
FIG. 8 is a schematic drawing showing structure of another embodiment according to the present invention

Refer to a partial enlarged view in FIG. 8, a plurality of first electrodes 12 is disposed on the bottom surface 110 of the slot 11 and both the side walls 111, 112 of the slot 11 are provided with a first guide rail 13 corresponding to each other. When the two outer frames 10 of the same type are connected in parallel, the two slots 11 of the two outer frames 10 adjacent to each other form a linked slot P (as shown in FIG. 3). The first electrodes 12 of the respective slots 11 of the same outer frame 10 are electrically connected to one another in a one-on-one manner. That means the first electrodes 12 of the plurality of the slots 11 of the same outer frame 10 have the same electrical properties so that power or control signals can be transmitted to each of the parallel-connected lighting fans after at least two parallel-connected lighting fans being connected.

As shown in FIG. 2, in a preferred embodiment, one side of the outer frame 10 of the lighting fan going to be connected to the other lighting fan is provided with a first magnetic member 41 while another side of the other frame 10 opposite to the side of the outer frame 10 with the first magnetic member 41 is provided with a second magnetic member 42 which is mated with the first magnetic member 41. In a preferred embodiment, the first magnetic member 41 and the second magnetic member 42 are disposed inside the outer frame 10. In another preferred embodiment, the first magnetic member 41 and the second magnetic member 42 are magnets able to be magnetically attached to each other. In a further embodiment, the first magnetic member 41 is a magnet and the second magnetic member 42 is an iron piece. In a further embodiment, the first magnetic member 41 is an iron piece and the second magnetic member 42 is a magnet.

In a preferred embodiment, one side of the outer frame 10 of the lighting fan going to be connected to the other lighting fan is provided with a first positioning member 43 while another side of the outer frame 10 opposite to the side of the outer frame 10 with the first positioning member 43 is provided with a second positioning member 44 which is mated with the first positioning member 43. In a preferred embodiment, the first positioning member 43 is a protruding block while the second positioning member 44 is a concave portion able to be coupled with the first positioning member 43. By the first magnetic member 41 and the second magnetic member 42 magnetically attached to each other and with assistance of the first positioning member 43 and the second positioning member 44, parallel connection between the two lighting fans of the same type can be completely faster and more accurately.

In a preferred embodiment of the present invention, the electric motor 20 is arranged at a center of the outer frame 10 and electrically connected to the first electrode 12 of one of the plurality of the slots 11 for getting power. The fan blade 21 is connected to the output shaft of the electric motor 20.

The plug-in electrical connector 50 provides the following functions. First the plug-in electrical connector 50 is used to link the two parallel-connected outer frames 10. The plug-in electrical connector 50 is also used as a connecting member for transmission of power and control signals of at least two parallel-connected lighting fans. The plug-in electrical connector 50 is further used as a power connector for electrical connection between at least two parallel-connected lighting fans and external power supplies.

As shown in FIG. 5-1, FIG. 5-2, and FIG. 6, in order to provide the above functions, the plug-in electrical connector 50 includes one housing 51 and a circuit board 52 mounted in the housing 51. The housing 51 is provided with a third guide rail 511 and the circuit board 52 consists of a plurality of second electrodes 53 and a plurality of third electrodes 54 which are electrically connected to the second electrodes 53 in a one-on-one manner. For example, the second electrodes 53 and the third electrodes 54 are electrically connected by printed circuit disposed on the circuit board 2. In a preferred embodiment, a shape of the housing 51 and a shape of the linked slot P are matched so that the housing 51 is mounted in the linked slot P. Thereby the plug-in electrical connector 50 can be plugged into the linked slot P or unplugged from the linked slot P in a pluggable direction D (as shown in FIG. 3). After the plug-in electrical connector 50 being plugged into the linked slot P, the second electrodes 53 are in contact with the first electrodes 12 of one of the two outer frames 10 parallel connected to each other (as the first electrodes 12 of the outer frame 10 on the right side in FIG. 6) while the third electrodes 54 are in contact with the first electrodes 12 of the other one of the outer frames 10 parallel connected to each other (as the first electrodes 12 of the outer frame 10 on the left side in FIG. 6). At the same time, the third guide rail 511 is just coupled to the first guide rails 13 of the linked slot P (as shown in FIG. 2 and FIG. 3) so as to link the two outer frames 10 of the same type connected in parallel. The electrical connection of the power source (power supply) and control signals is also completed. In a preferred embodiment, the first guide rail 13 is a long strip member projecting from the two side walls 111, 112 of the slot 11 while the third guide rail 511 is a long straight groove formed on a surface of an outer side of the housing 51. The first electrodes 12 are golden fingers while the second and the third electrodes 53, 54 are spring-pin elastic electrodes or spring-plate elastic electrodes.

The light emitting member 30 is electrically connected to one of the electrodes including the first electrode 12, the second electrode 53, and the third electrode 54 so as to get external power supply from one of the first, the second, and the third electrodes 12, 53, 54. In a preferred embodiment, the light emitting member 30 can be a light emitting diode (LED) or a small liquid crystal display (LCD). In another preferred embodiment, the light emitting member 30 can be a single-color LED or a multi-color LED.

Figures 2, 5:
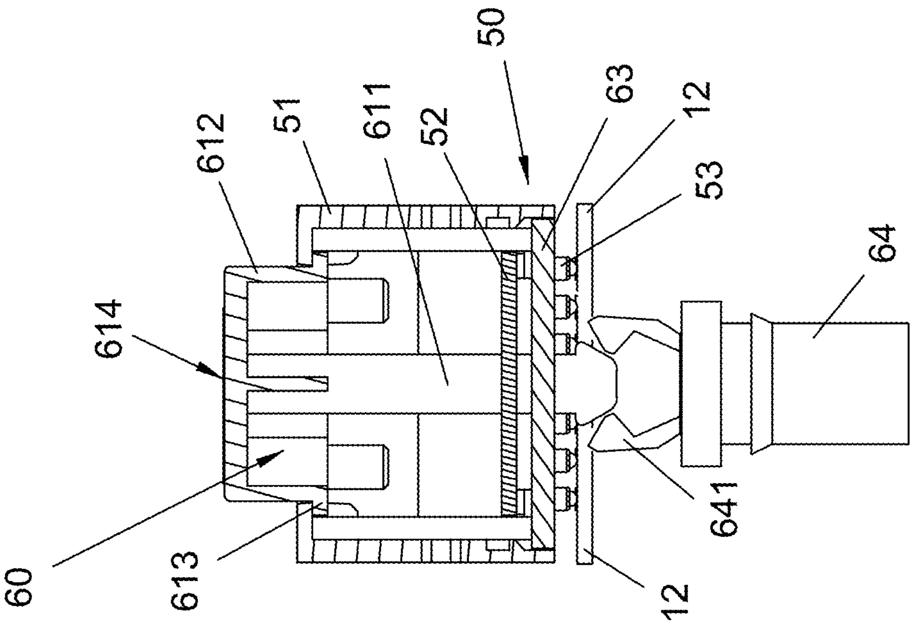
Figures 1, 5:
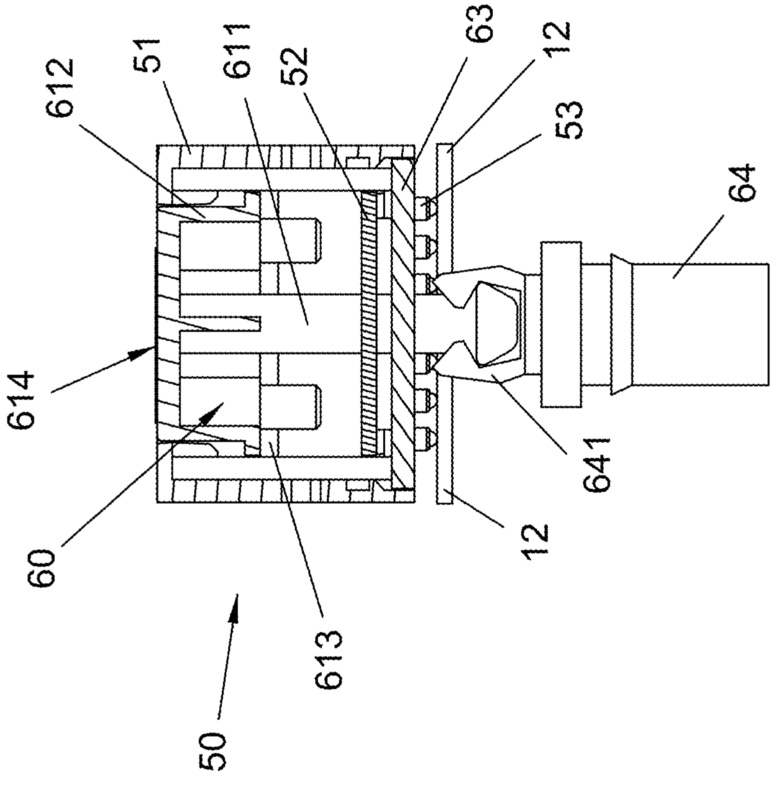
Figure 6:
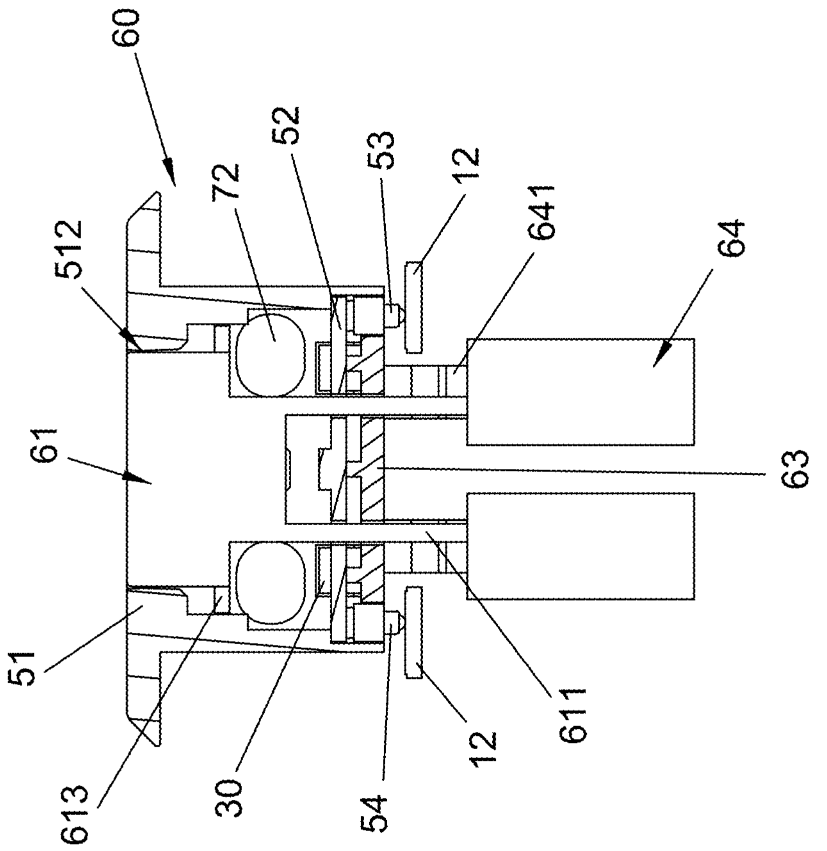
FIG. 6 is a partial sectional view of a plug-in electrical connector of an embodiment according to the present invention.
Figure 7:
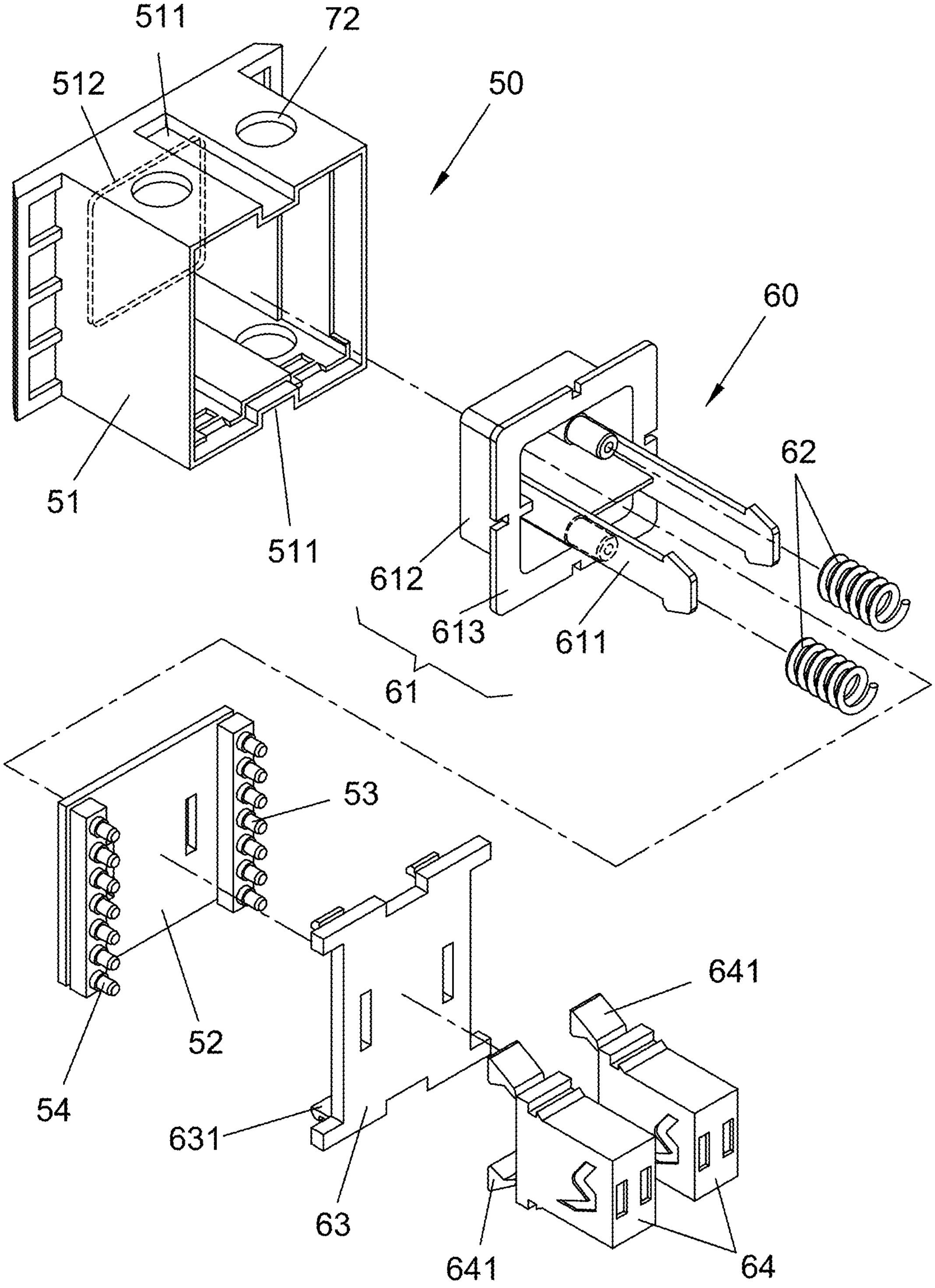
FIG. 7 is an exploded view of the embodiment in FIG. 6 according to the present invention.

In a preferred embodiment, the plug-in electrical connector 50 further includes a push button switch 60 which is used for fixing the plug-in electrical connector 50 in the linked slot P, without coming off, or releasing the plug-in electrical connector 50 from the linked slot P to be unplugged from the linked slot P. Refer to FIG. 6 and FIG. 7, the push button switch 60 consists of a push button 61, a spring 62, a back cover 63, and a push-type fastener 64. The push button 61 is slidably disposed on the housing 51 and moved forward and backward to an act position (FIG. 5-1) and a release position (FIG. 5-2) in the pluggable direction D. The spring 62 is arranged between a back surface of the push button 61 and the back cover 63 for providing an elastic force to push the push button 61 back to the release position in an elongated state. The push button 61 and the circuit board 52 are mounted in the housing 51 and the back cover 63 is disposed on the bottom of the housing 51 for sealing the push button 61 and the circuit board 52 in the housing 51. For example, the back cover 63 is disposed on the bottom of the housing 51 by a barb 631. The second electrodes 53 and the third electrodes 54 of the circuit board 52 are inserted through the back cover 63 to be exposed and in contact with the first electrodes 12 of the outer frame 10 (FIG. 6).

Refer to FIG. 6 and FIG. 8, the push-type fastener 64 is arranged at the bottom of the slot 11 of the outer frame 10 and provided with a moveable claw 641 used for clipping and moving the push button 61 to the act position and further fixing the plug-in electrical connector 50 in the linked slot P, without loosening. On the other hand, the push button 61 can also be released from the moveable claw 641 to be pushed back to the release position by the elastic force of the spring 62. Then the plug-in electrical connector 50 is further pulled out of the linked slot P.

A back surface of the push button 61 is provided with at least one latch 611 extending in the plug-in direction D. Refer to FIG. 7, in a preferred embodiment, the push button 61 is provided with the two latches 611 arranged parallel to each other and interacting with the two push-type fasteners 64 correspondingly. The push button 61 further consists of a button cap 612 and a stopping portion 613 projecting from a periphery of the button cap 612. A top of the button cap 612 is inserted through an opening 512 on a top of the housing 51 and the push button 61 can be moved freely along the plug-in direction D. The stopping portion 613 would interfere with an edge of the opening 512 of the housing 51 to prevent the push button 61 from coming off the housing 51.

Figure 4:
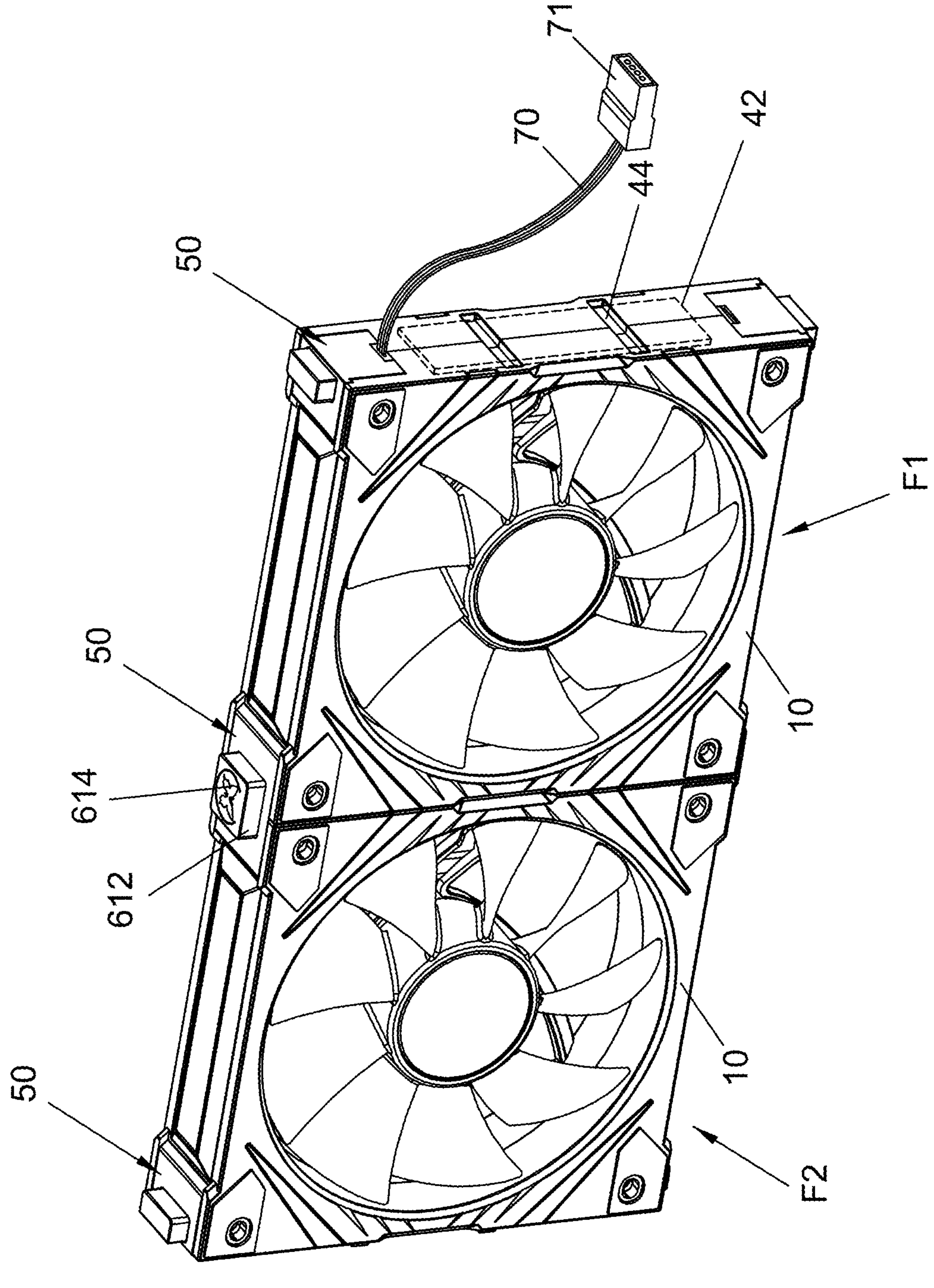

When the plug-in electrical connector 50 is not plugged in the linked slot P, the push button 61 is located at the release position (as shown in FIG. 3). After the plug-in electrical connector 50 being plugged into the linked slot P (as shown in FIG. 4), the push button 61 is pushed to the act position by the button cap 612. A front end of each of the latches 611 of the push button 61 further pushes the moveable claw 641 to be clipped by the moveable claw 641 and held on the act position (as shown in FIG. 5-1). Thus the plug-in electrical connector 50 is fixed in the linked slot P, without coming off. Then the button cap 612 of the push button 61 is pressed again and the moveable claw 641 is pushed by the latches 611 so that the latches 611 of the push button 61 is released from the moveable claw 641 (as shown in FIG. 5-2). Thereby the push button 61 is pushed back to the release position by the elastic force of the spring 62 and the plug-in electrical connector 50 can be pulled out of the linked slot P.

In a preferred embodiment, the light emitting member 30 is a light emitting diode (LED) arranged at the circuit board 52. A front surface of the button cap 612 of the push button 61 is provided with a translucent portion 614 which permits light emitted from the LED to pass through. The translucent portion 614 can be a through hole which is in the form of a word or a figure for providing visual effect by lighting word or lighting figure, as shown in FIG. 2.

In another preferred embodiment, the light emitting member 30 is a small liquid crystal display (LCD) disposed on the side of the outer frame (as shown in FIG. 1). The small LCD is electrically connected to the first electrodes 12 to provide images combined with lighting effect.

Refer to FIG. 1, in a preferred embodiment, at least one of the plug-in electrical connectors 50 is provided with an external power cord 70 having one end electrically connected to the second electrode 53 or the third electrode 54 and the other end electrically connected to a power connector 71 (such as USB connector or XH2.54 connector) used for electrical connection with an external power supply (such as a fan electrical connector on a computer motherboard for control of external cooling fan). In another preferred embodiment, the power connector 71 is an electrical connector including a RGB (red-green-blue) contact point and a pulse-width modulation (PWM) contact point respectively used for electrical connection to lighting signal controller of LED and a PWM speed controller of the electric motor 20. In a preferred embodiment, when the two parallel-connected lighting fans of the same type are connected to each other by the outer frames 10, the first plug-in electrical connector 50 of the first parallel-connected lighting fan F1 is provided with the external power cord 70 for electrical connection to an external power supply and/or control signals. In another preferred embodiment, one plug-in electrical connector 50 used as a terminal end is inserted into the last slot 11 of the second parallel-connected lighting fan F2.

In a preferred embodiment, the first plug-in electrical connector 50 for electrical connection to the external power supply and the plug-in electrical connector 50 in the last slot 11 and used as the terminal end are both in a half size (as shown in FIG. 2). In other words, an edge of the first plug-in electrical connector 50 or the plug-in electrical connector 50 used as the terminal end is flush with the outer frame 10 so that the parallel-connected lighting fan can have a complete appearance.

In a preferred embodiment, both the two side walls 111, 112 of each of the slots 11 and the housing 51 of the plug-in electrical connector 50 in the linked slot P are provided with corresponding insertion holes 72 each of which is inserted through by a bolt to install the parallel-connected lighting fan at a preset position (such as a computer case).

In a preferred embodiment, the number of the first electrode 12, the second electrode 53, and the third electrode 54 is determined according to actual needs. Basically, the number of the first electrode 12, the second electrode 53, and the third electrode 54 should be sufficient to provide not only power required for electrical connection of the electric motor 20 and the light emitting member 30 but also control signals to the electric motor 20 and the light emitting member 30 according to their specific functions. For example, the control signals include speed control signals of the electric motor 20, control signals of the light emitting member 30 for generating dynamic lighting effect and light in different colors, and image signals of LCD.

Figure 9:
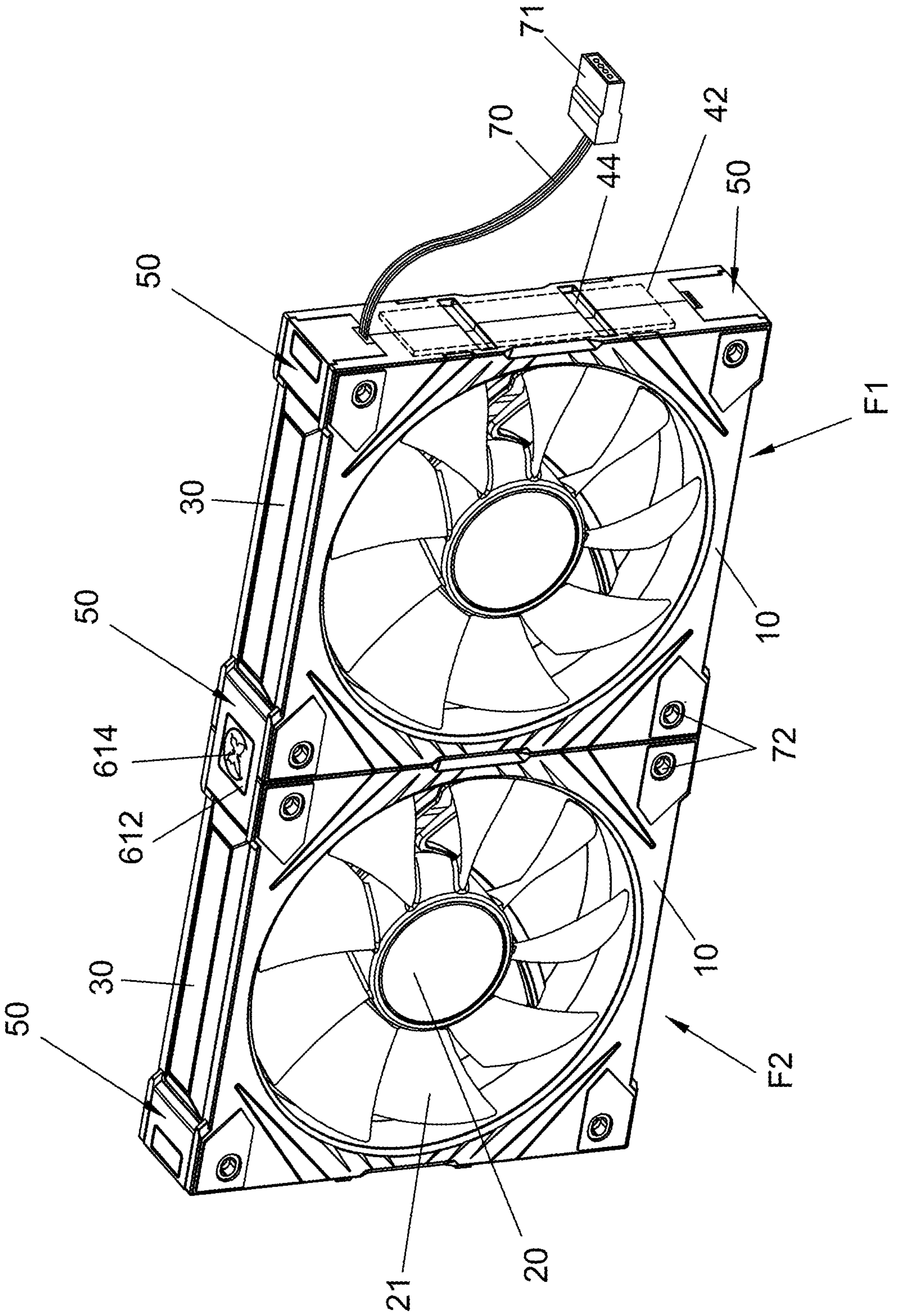
FIG. 9 is an exploded view of the embodiment in FIG. 8 according to the present invention.

As shown in FIG. 8 and FIG. 9, in a preferred embodiment, the shape of the outer frame 10 of the parallel-connected lighting fan is rectangular and each of the two parallel sides of the outer frame 10 of the parallel-connected lighting fan is provided with the slots 11. In other words, each of the four corners of the rectangular outer frame 10 is provided with the slot 11. For the plurality of the slots 11 disposed on the same parallel-connected lighting fan, the first electrodes 12 of the slots 11 are electrically connected in a one-on-one manner by layout (wires) inside the same outer frame 10. The first electrodes 12 of the slots 11 share one external power cord 70 and one power connector 71 to get power supply from the outside.

Figure 10:
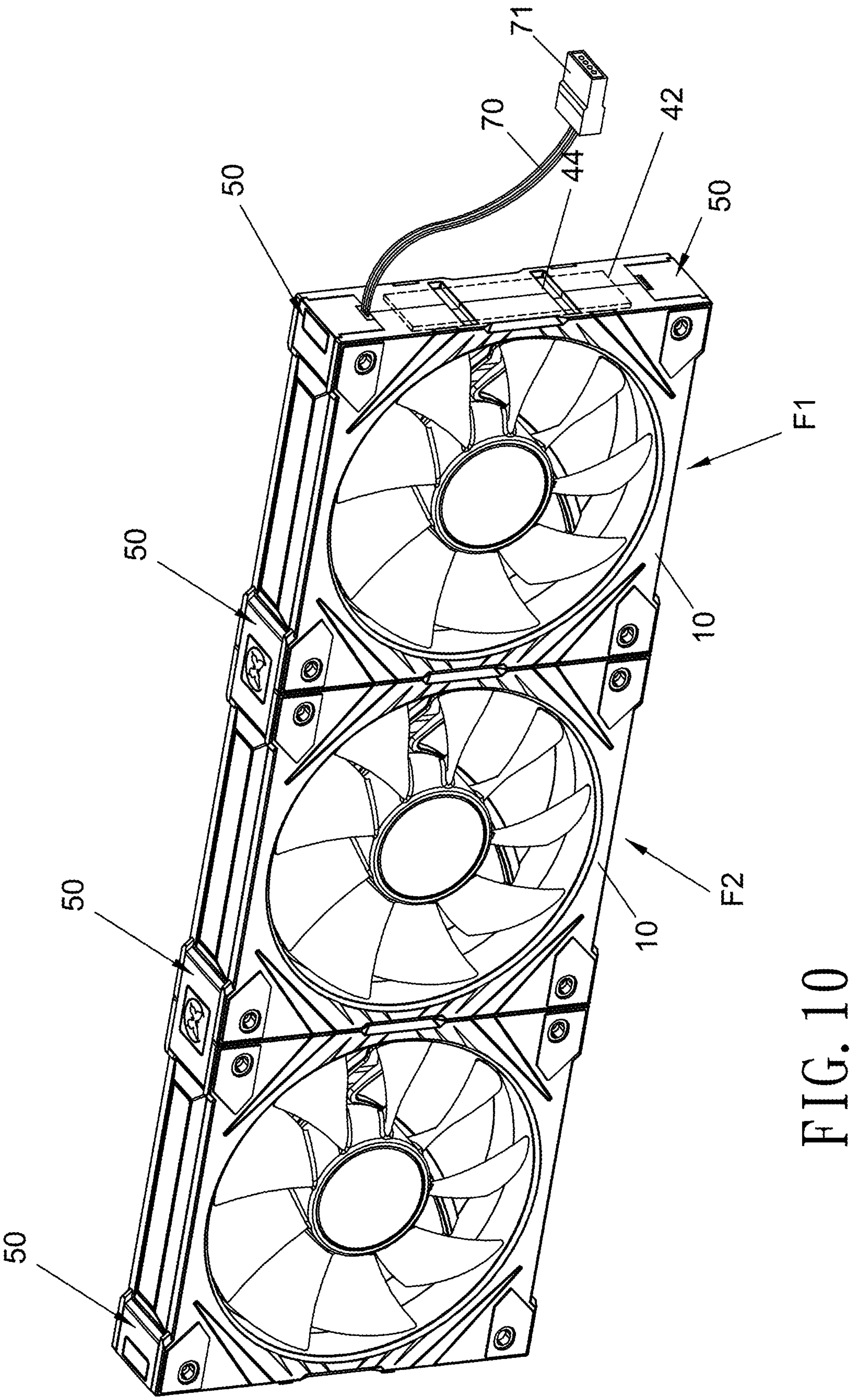
FIG. 10 is a schematic drawing showing an embodiment in use according to the present invention.

After the outer frames 10 of at least the two or three parallel-connected lighting fans (FIG. 1 or FIG. 10) being connected by the plug-in electrical connector(s) 50, lighting effect is provided on the periphery of the outer frames 10 of the parallel-connected lighting fan. And the outer frames 10 of the plurality of the parallel-connected lighting fans are connected in parallel more reliably.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

The invention claimed is:

1. A parallel-connected lighting fan comprising:

an outer frame provided with a plurality of slots each of which is formed at an intersection of two adjacent sides of the outer frame; a plurality of first electrodes disposed within each of the slots and both side walls of the slot provided with a first and a second guide rails correspondingly; wherein the outer frame is connected in parallel with another outer frame, one slot of the outer frame and one slot of the another outer frame are adjacent to each other to form a linked slot;

an electric motor with a fan blade connected to an output shaft of the electric motor; both the electric motor and the fan blade arranged at a center of the outer frame and the electric motor electrically connected to the first electrodes of one of the slots for getting power;

a plug-in electrical connector which includes a housing provided with a third guide rail engaged with the linked slot and a circuit board mounted in the housing; the circuit board having a plurality of second electrodes and a plurality of third electrodes which are electrically connected to the second electrodes in a one-on-one manner; the plug-in electrical connector being plugged into or unplugged from the linked slot in a pluggable direction; when the plug-in electrical connector is plugged into the linked slot, the second electrodes are in contact with the first electrodes of the outer frame while the third electrodes are in contact with first electrodes of the another outer frame; and a light emitting member electrically connected to one of the first electrodes, the second electrodes, and the third electrodes;

wherein the first and the second guide rails are a long strip member projecting from the two side walls of the slot, respectively, and the third guide rail is a long straight groove formed on a surface of an outer side of the housing.

2. The parallel-connected lighting fan as claimed in claim 1, wherein one of the sides of the outer frame used for connecting with the another outer is provided with a first magnetic member while the side of the outer frame opposite to the side with the first magnetic member is provided with a second magnetic member which is mated with the first magnetic member.

3. The parallel-connected lighting fan as claimed in claim 2, wherein the first magnetic member and the second magnetic member are magnets able to be magnetically attached to each other.

4. The parallel-connected lighting fan as claimed in claim 1, wherein the first electrodes are golden fingers while the second electrodes and the third electrodes are spring-pin elastic electrodes or spring-plate elastic electrodes.

5. The parallel-connected lighting fan as claimed in claim 1, wherein the light emitting member is a light emitting diode (LED) or a liquid crystal display (LCD).

6. The parallel-connected lighting fan as claimed in claim 1, wherein the light emitting member is a single-color light emitting diode (LED) or a multi-color LED.

7. The parallel-connected lighting fan as claimed in claim 1, wherein the plug-in electrical connector further includes a push button switch which is provided with a push button, a spring, a back cover, and a push-type fastener; wherein the push-type fastener is arranged at the slot of the outer frame and provided with a moveable claw; wherein the push button is slidably disposed on the housing and moved forward and backward to an act position and a release position in the pluggable direction; the spring is arranged between a back surface of the push button and the back cover for providing an elastic force to push the push button back to the release position in an elongated state; the push button together with the circuit board is mounted in the housing and the back cover is disposed on a bottom of the housing for sealing the push button and the circuit board in the housing; wherein the second electrodes and the third electrodes of the circuit board are inserted through the back cover to be exposed and in contact with the first electrodes of the outer frame; wherein the back surface of the push button has two latches extending in the plug-in direction, and the two latches are parallel to each other; the moveable claw is able to clip the two latches for holding the push button at the act position so that the plug-in electrical connector is further fixed in the linked slot; the moveable claw is able to release the two latches so that the push button is pushed back to the release position by the elastic force of the spring and the plug-in electrical connector is further pulled out of the linked slot.

8. The parallel-connected lighting fan as claimed in claim 7, wherein when the outer frame and the another outer frame are connected in parallel, the two latches interact with the corresponding push-type fasteners located on the outer frame and the another outer frame, respectively.

9. The parallel-connected lighting fan as claimed in claim 7, wherein the push button further includes a button cap and a stopping portion projecting from a periphery of the button cap; a top of the button cap is inserted through an opening on a top of the housing and the push button is able to be moved freely in the plug-in direction; the stopping portion interferes with an edge of the opening of the housing to prevent the push button from coming off the housing.

10. The parallel-connected lighting fan as claimed in claim 9, wherein the light emitting member is a light emitting diode (LED) which is arranged at the circuit board and electrically connected to the second electrodes or the third electrodes; a front surface of the button cap is provided with a translucent portion which permits light emitted from the LED to pass through.

11. The parallel-connected lighting fan as claimed in claim 10, wherein the translucent portion is a through hole which is in the form of a word or a figure; the LED is a single-color LED or a multi-color LED.

12. The parallel-connected lighting fan as claimed in claim 1, wherein the light emitting member is a liquid crystal display (LCD) disposed on the side of the outer frame and electrically connected to the first electrodes.

13. The parallel-connected lighting fan as claimed in claim 1, wherein the plug-in electrical connector is provided with an external power cord having one end electrically connected to the second electrodes or the third electrodes; the other end of the external power cord is electrically connected to a power connector.

14. The parallel-connected lighting fan as claimed in claim 13, wherein the outer frame is rectangular and each of two parallel sides of the outer frame is provided with the slots; the first electrodes of the slots disposed on the outer frame are electrically connected in a one-on-one manner by wires inside the outer frame; the first electrodes of the slots share the external power cord and the power connector.

15. The parallel-connected lighting fan as claimed in claim 1, wherein the two side walls of the slot and the housing of the plug-in electrical connector inserted in the linked slot are provided with corresponding insertion holes.

* * * * *